(12) United States Patent  (10) Patent No.: US 8,345,697 B2
Kotha et al.  (45) Date of Patent: Jan. 1, 2013

(54) SYSTEM AND METHOD FOR CARRYING PATH INFORMATION

(75) Inventors: Saikrishna Kotha, Austin, TX (US); Gaurav Chawla, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 218 days.

(21) Appl. No.: 12/857,945

(22) Filed: Aug. 17, 2010

(65) Prior Publication Data

US 2012/0044944 A1  Feb. 23, 2012

(51) Int. Cl.
*H04L 12/56* (2006.01)
(52) U.S. Cl. .................. 370/401; 370/402; 709/238
(58) Field of Classification Search .................. 370/400, 370/401; 709/238
See application file for complete search history.

(56) References Cited

U.S. PATENT DOCUMENTS

| 2008/0107027 | A1* | 5/2008 | Allan et al. ................. 370/235 |
| 2008/0310342 | A1 | 12/2008 | Kruys et al. |
| 2009/0161584 | A1 | 6/2009 | Guan |
| 2010/0027420 | A1 | 2/2010 | Smith |
| 2010/0061269 | A1 | 3/2010 | Banerjee et al. |
| 2010/0165995 | A1 | 7/2010 | Mehta et al. |
| 2011/0019678 | A1* | 1/2011 | Mehta et al. ................. 370/401 |
| 2011/0165995 | A1* | 7/2011 | Paulus et al. ..................... 482/5 |
| 2011/0235523 | A1* | 9/2011 | Jha et al. ....................... 370/242 |

OTHER PUBLICATIONS

Cisco System, "Introduction to IS-IS protocol", 2002, the whole document.*
U.S. Appl. No. 12/853,883, filed Aug. 10, 2010.
U.S. Appl. No. 12/856,247, filed Aug. 13, 2010.

* cited by examiner

*Primary Examiner* — Man Phan
*Assistant Examiner* — Mewale Ambaye
(74) *Attorney, Agent, or Firm* — Larson Newman, LLP

(57) ABSTRACT

A routing bridge in a Transparent Interconnection of Lots of Links (TRILL) domain includes a link coupled to a device in the TRILL domain, and an Intermediate System to Intermediate System (IS-IS) Traffic Engineering (TE) module that receives configuration information from the device, and that determines that data packets received by the routing bridge need to be routed to the device based upon the configuration information. The routing bridge receives a data packet, and routes the data packet to the link in response to the IS-IS TE module determining that the data packet needs to be routed to the device.

16 Claims, 4 Drawing Sheets

SYSTEM AND METHOD FOR CARRYING PATH INFORMATION

FIELD OF THE DISCLOSURE

This disclosure relates generally to information handling systems, and relates more particularly to carrying path information in a TRILL domain.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

Figure 1:
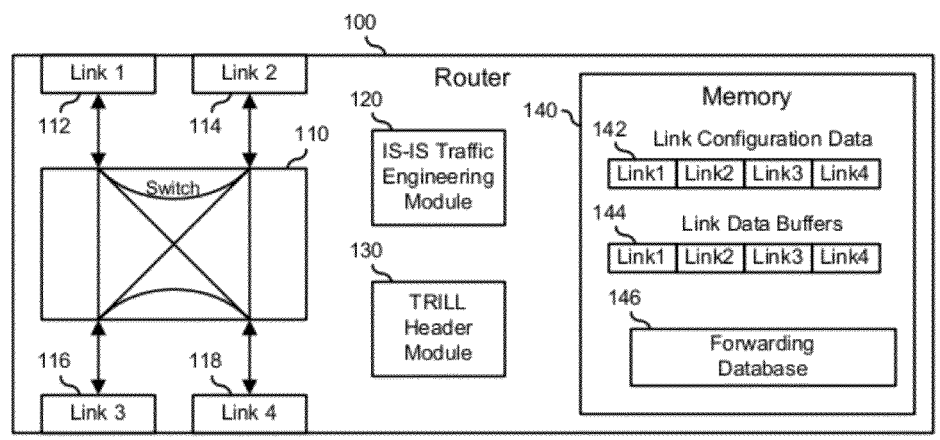
FIG. 1 is a functional block diagram of a routing bridge according to an embodiment of the present disclosure.

FIG. 1 illustrates an embodiment of a routing bridge (RBridge) 100. RBridge 100 can be implemented as an information handling system, or can be part of an information handling system. For the purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, such as volatile memory (such as random-access memory), nonvolatile memory (such as read-only memory or flash memory), or any combination thereof, one or more processing resources, such as a central processing unit (CPU) or a graphics processing unit (GPU), hardware or software control logic, or any combination thereof. Additional components of the information handling system can include one or more storage devices, one or more communications ports for communicating with external devices, as well as various input and output (I/O) devices such as a keyboard, a mouse, a video/graphic display, or any combination thereof. The information handling system can also include one or more buses operable to transmit communications between the various hardware components. Portions of an information handling system may themselves be considered as an information handling system.

RBridge 100 includes a switch 110, links 112, 114, 116, and 118, a switch 150, an IS-IS TE module 120, a TRILL header module 130, and a memory 140. Memory 140 includes link configuration data 142, link data buffers 144, and a forwarding database (FDB) 146. RBridge 100 operates to interconnect computing devices by receiving data packets from a device connected to one link and selectively forwarding the data packets to a device connected to another link, based upon source and destination address information included in the data packets. For example, upon receiving a data packet on link 112 that has a destination address associated with a device that is connected to link 118, RBridge 100 can direct switch 110 to forward the data packet from link 112 to link 118.

RBridge 100 directs packets based upon routing information included in forwarding database 146. In a particular embodiment, forwarding database 146 is implemented as a routing information base (RIB) that routes packets based upon source and destination Internet Protocol (IP) addresses that are associated with the internet layer protocol. In another embodiment, forwarding database 146 is implemented as a forwarding information base (FIB) that routes data packets based upon source and destination Media Access Control (MAC) addresses that are associated with the link layer protocol. As RBridge 100 receives data packets that include a particular source MAC address on a particular port, forwarding base 186 is maintained to associate the particular MAC address with the particular link. Then, when a data packet is received with the particular MAC address as the destination, switch 150 will direct the data packet to the associated link.

Links 112, 114, 116, and 118 each include associated link configuration data 142 that defines the parameters of the links. For example, links 112, 114, 116, and 118 can be configured to operate at different link data rates, to have different maximum data packet sizes or maximum transmission units (MTUs), to operate using different data protocols such as Fibre Channel on Ethernet (FCoE), or to have other configuration parameters as needed or desired. Links 112, 114, 116, and 118 each include an associated link data buffer 144 that permits queuing and prioritization of the data packets that are received and forwarded by the links. In a particular embodiment, RBridge 100 is an Ethernet router that functions in accordance with the IEEE 802.3 Local Area Network (LAN) standards. In another embodiment, links 112, 114, 116, and 118 have configurable link data rates and RBridge 100 is an energy efficient Ethernet router in accordance with the IEEE 802.3az standard.

RBridge 100 uses IS-IS TE module 120 for communicating the connectivity of RBridge 100 with other adjoining RBridges (not illustrated). As such, RBridge 100 can be managed in the Data Link Layer (Layer 2) without requiring extra configuration in the Network Layer (Layer 3) or assignment of Internet protocol (IP) addresses. RBridge 100 becomes aware of the connectivity and configuration of each other RBridge through communication of IS-IS hello packets and link state packets. RBridge 100 includes a listing of two-byte nicknames for itself and for each adjoining RBridge. TRILL header module 130 uses the nicknames to compose a TRILL header that is appended to each data packet that is routed from RBridge 100 to an adjoining RBridge.

Figure 2:
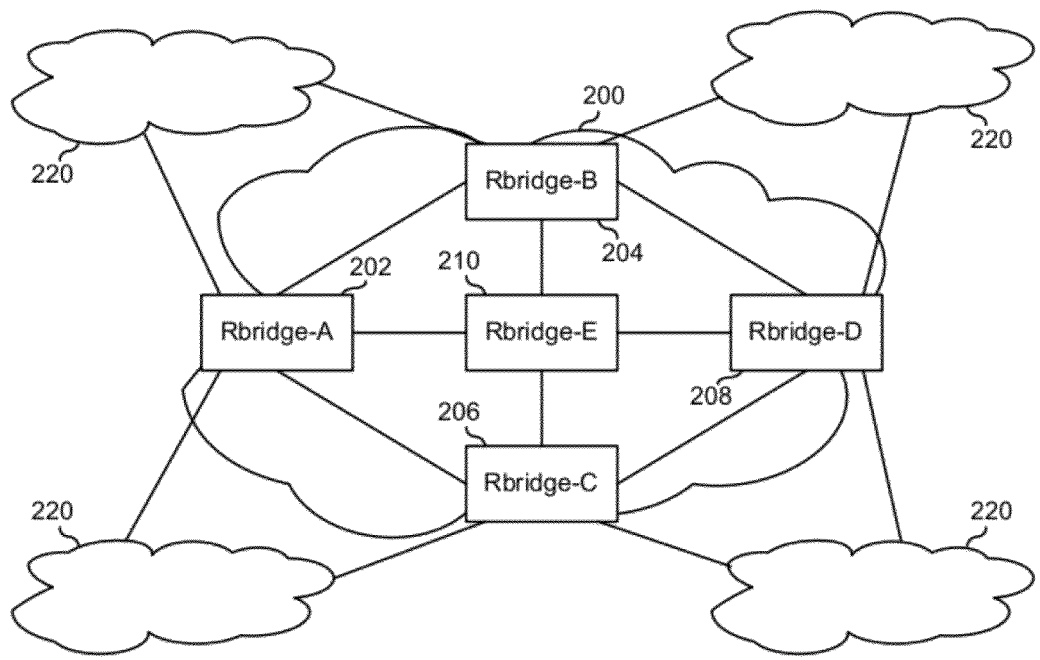
FIG. 2 is a functional block diagram of a Transparent Interconnect of Lots of Links (TRILL) domain including routing bridges similar to the routing bridge of FIG. 1.

FIG. 2 illustrates an embodiment of a TRILL domain 200 including RBridges 202, 204, 206, 208, and 210, similar to RBridge. TRILL domain 200 is connected to a network 220. As illustrated RBridges 202 through 210 provide multiple data paths between various portions of network 220. RBridges 202 through 210 each broadcast their connectivity to all other RBridges through a link state protocol such that each RBridge can determine optimal paths for unicast and multicast data transfers through TRILL domain 200. In a particular embodiment, TRILL domain 200 uses the IS-IS TE protocol as the link state protocol for communicating the connectivity of RBridges 202 through 210. As such, TRILL domain 200 is managed using an IS-IS TE module similar to IS-IS TE module 120, and each RBridge 202 through 210 becomes aware of the connectivity and configuration of each other RBridge through communication of IS-IS hello packets and link state packets.

Figure 3:
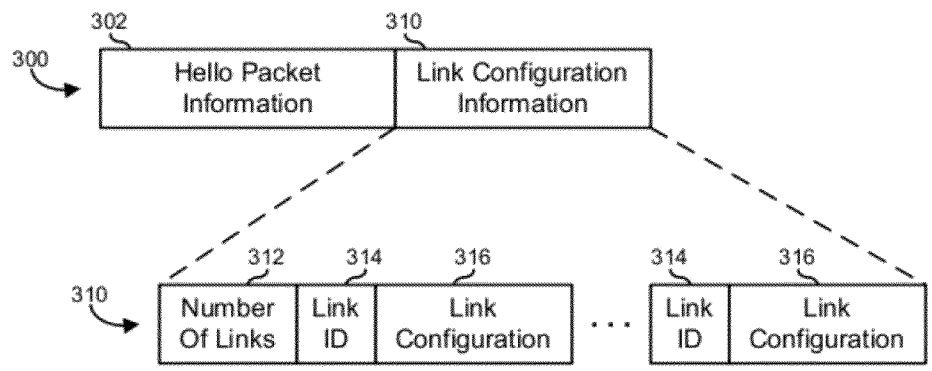
FIG. 3 is a view of an Ethernet frame for an Intermediate System to Intermediate System (IS-IS) Traffic Engineering (TE) transaction according to an embodiment of the present disclosure.

FIG. 3 illustrates an embodiment of an IS-IS link configuration hello packet 300 including hello packet information 302 and link configuration information 310. Link configuration information 310 includes a number of links field 310, and one or more pairs of link identifier fields 314 and link configuration fields 316. RBridges 202 through 210 each include particular link configuration information that constrains the ability of data to transit TRILL domain 200 along a particular path. For example, RBridges 202 through 210 can operate at different link data rates, have different maximum data packet sizes or maximum transmission units (MTUs), operate using different data protocols such as Fibre Channel on Ethernet (FCoE), or have other configuration parameters as needed or desired. Hello packet 300 provides the configuration information for each RBridge 202 through 210 to the other RBridges, by identifying each link in a different link identifier field 314 and the associated configuration information in link configuration field 316. When the link states and configurations for RBridges 202 through 210 are propagated through TRILL domain 200, then best paths can be selected for packets that transit the TRILL domain, based upon the traffic type, traffic priority, needed data rate, or other considerations as needed or desired.

Figure 4:
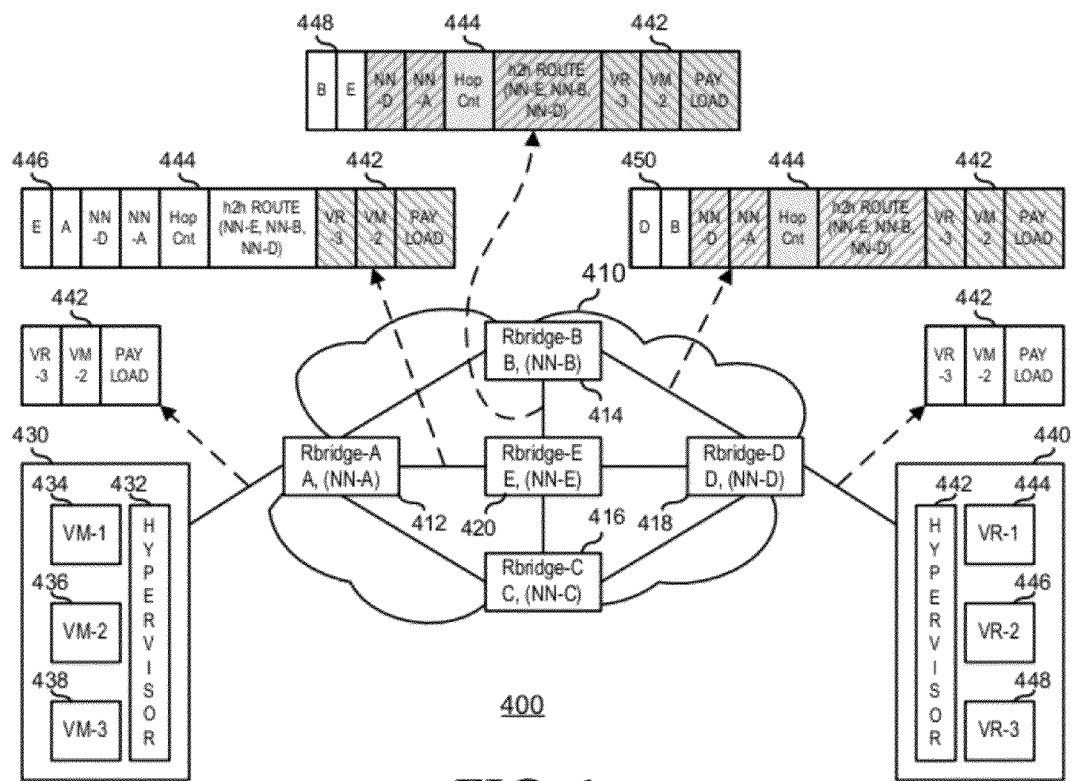
FIG. 4 is a functional block diagram illustrating another embodiment of a TRILL domain similar to the TRILL domain of FIG. 2.

FIG. 4 illustrates an embodiment of a network 400 including a TRILL domain 410 similar to TRILL domain 200, a host processing system 430, and a virtualized resource 440. TRILL domain 410 includes RBridges 412, 414, 416, 418, and 420. RBridges 412 through 420 provide multiple data paths between various portions of network 400. RBridge 412 is connected to host processing system 430, and RBridge 418 is connected to virtualized resource 440. Host processing system 430 represents a processing resource on network 400 and includes a virtual machine hypervisor 432 and one or more virtual machines 434, 436, and 438. An example of a host processing system includes a server, a server cluster, another processing system, or a combination thereof. Virtualized resource 440 includes a virtual resource hypervisor 442 and one or more virtual resources 444, 446, and 448. An example of a virtualized resource includes another host processing system similar to host processing system 430, a storage area network, a virtual storage resource, another virtualized resource, or a combination thereof. Note that host processing system 430 and virtualized resource 440 are illustrative, that network 400 can include other computing resources connected to TRILL domain 410, and that the other computing resources can be virtualized resources, logical resources, physical resources, or a combination thereof, as needed or desired.

When a data frame from a node of network 400 is received in TRILL domain 410, a TRILL header module similar to TRILL header module 130 in the receiving RBridge 412 through 420, called the "ingress RBridge," appends a TRILL header and an outer Layer 2 header to the frame. The TRILL header includes a hop count, a designation of the ingress RBridge, and a designation of the last RBridge in TRILL domain 410 that handles the frame, called the "egress RBridge." The outer Layer 2 header includes a source address of the current RBridge 412 through 420 and a destination address for the next hop RBridge. Each successive RBridge 412 through 430 leaves the TRILL header unchanged but modifies the outer Layer 2 header to include itself as the source address and the next hop RBridge as the destination address. When the frame reaches the egress RBridge 412 through 420, the TRILL header is removed and the frame is forwarded to the appropriate node of network 400. In this way, the routing behavior for frames transiting TRILL domain 410 is transparent to network 400, and the TRILL domain appears as a single link to Layer 3 devices.

FIG. 4 also illustrates an example of a data packet 442 that is originated in virtual machine 436, and is destined for virtual resource 448. Data packet 442 includes the source address for virtual machine 436, the destination address for virtual resource 448, and a data payload. RBridge 412 is the ingress RBridge that receives data packet 442 from host processing system 430. Thus RBridge 412 determines a particular RBridge 412 through 420 to select as the egress RBridge. Here, RBridge 418 is the egress RBridge. RBridge 412 also determines a route through TRILL domain 410 between RBridge 412 and RBridge 418, based upon the particular characteristics of data packet 442. The route is called the hop-to-hop route. For example, RBridge 412 can determine that a particular hop-to-hop route through TRILL domain 410 is reserved for data traffic from a particular virtual machine 434, 436, or 438, or to a particular virtual resource 444, 446, or 448. The RBridge can also determine that a particular hop-to-hop route permits large MTU size packets, has a higher data rate, or is reserved for traffic of a particular priority level, or a combination thereof, as needed or desired. Here, RBridge 412 determines the hop-to-hop route for data packet 442 to be from RBridge 412, to RBridge 420, to RBridge 414, and finally to RBridge 418.

Each RBridge 412 through 420 includes a two-byte nickname used by the ingress RBridge to compose a TRILL header 444. TRILL header 444 includes the nickname of the ingress RBridge, here RBridge 412, the nickname of the egress RBridge, here RBridge 418, a hop counter, here initialized to a value of "3" to designate that the data packet will take three hops through TRILL domain 410, and a hop-to-hop route field that includes the nicknames, in route order, of the RBridges that make up the route, here RBridge 420, followed by RBridge 414, and followed by RBridge 418. RBridge 412 appends TRILL header 444 to data packet 442. RBridge 412 also appends an outer header 446 to data packet. Outer header 446 includes a source address and a destination address for data packet 442 to transit to the next hop. Here, the source address is the address of RBridge 412, and the destination address is the address of RBridge 420. RBridge 412 then sends the new data packet including data packet 442, TRILL header 444, and outer header 446 to RBridge 420.

RBridge 420 receives the new data packet, decrements the hop counter in TRILL header 444, determines that RBridge 414 is the next RBridge in the hop-to-hop route, and replaces outer header 446 with another outer header 448 that includes a source address and a destination address for data packet 442 to transit to the next hop. Here, the source address is the address of RBridge 420, and the destination address is the address of RBridge 414. RBridge 420 then sends the new data packet including data packet 442, TRILL header 444, and outer header 448 to RBridge 414. RBridge 414 operates similarly to RBridge 420, decrementing the hop counter, determining that RBridge 418 is the next RBridge in the hop-to-hop route, replacing outer header 448 with another outer header 450 that includes RBridge 414 as the source address and RBridge 418 as the destination address for data packet 442 to transit to the next hop, and sending the new data packet to RBridge 418. RBridge 418 determines that it is the egress RBridge, removes TRILL header 442 and outer header 450, leaving data packet 442 intact, and sends the data packet to virtual resource 448.

Figure 5:
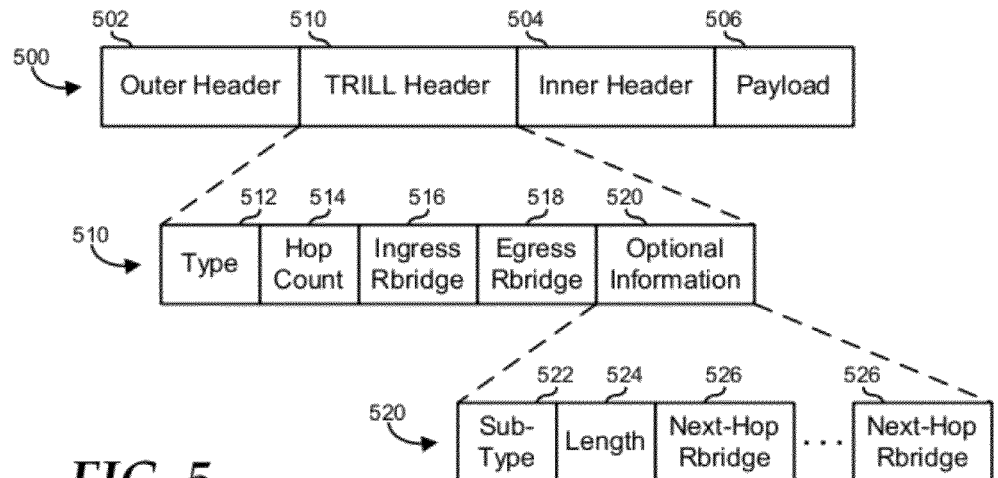
FIG. 5 is a view of a data packet for carrying end-to-end path information in a TRILL domain similar to the TRILL domain of FIG. 4.

FIG. 5 illustrates an embodiment of a data packet 500 for traffic in a TRILL domain similar to TRILL domain 410. Data packet 500 includes an outer header 502, an inner header 504, a payload 506, and a TRILL header 510. TRILL header 510 includes a type field 512, a hop count field 514, an ingress RBridge nickname field 516, an egress RBridge nickname field 518, and an optional information field 520. Type field 512 includes a unique designator that indicates that TRILL header 510 includes hop-to-hop route information. Hop count field 514, ingress RBridge nickname field 516, and egress RBridge nickname field 518 function as described above. Optional information field 520 includes a sub-type field 522, a length field 524, and one or more next-hop RBridge nickname fields 526. Sub-type field 522 includes a unique designator that indicates that optional information field 520 includes next hop information for a hop-to-hop route. Length field 524 provides information describing the number of RBridges that are in the hop-to-hop route. Put another way, length field 524 includes the number of following data bytes that are included in optional information field 520. Each sequential next-hop RBridge nickname field 526 includes the RBridge nickname for each next successive RBridge in the hop-to-hop route.

Figure 6:
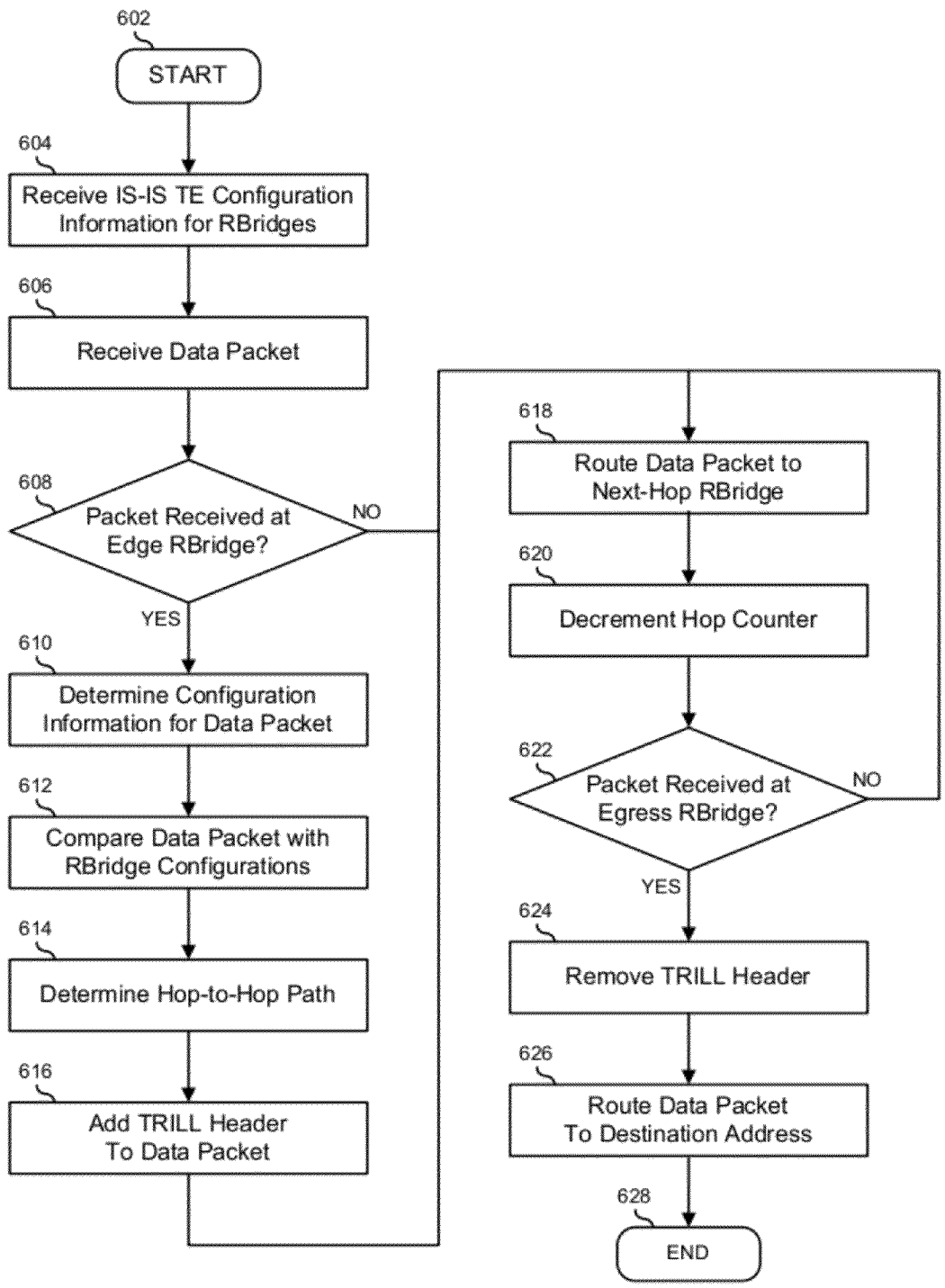
FIG. 6 is a flowchart illustrating a method for enabling selection of and carrying end-to-end path information in data packets in a TRILL domain similar to the TRILL domain in FIG. 3.

FIG. 6 illustrates a method for enabling virtual links for end-to-end virtualization in a network similar to the networks described in FIGS. 2 and 3. The method starts at block 602, and IS-IS TE configuration information for the RBridges in a TRILL domain are shared in block 604. For example, RBridges in TRILL domain 200 can share IS-IS link configuration hello packet 300 such that RBridges 202 through 210 are each aware of the data routing capabilities of each other RBridge. A data packet is received by the TRILL domain in block 606. A decision is made as to whether or not the data packet is received at an edge RBridge in decision block 608. If so, the "YES" branch of decision block 608 is taken, and configuration information for the data packet is determined in block 610. For example, the data packet can be determined to be FCoE data, ISCSI data, or have a small packet size. The configuration information for the data packet is compared to the configuration information of the RBridges in the TRILL domain in block 612, and a hop-to-hop path is determined in block 614. For example, FCoE data can be routed through RBridges that are enabled to route Data Center Bridging traffic, ISCSI data can be routed through RBridges that permit large MTU sizes, and small data packets can be routed through the shortest path through the TRILL domain. A TRILL header is added to the data packet in block 616. For example, the TRILL header can be similar to TRILL header 444.

After the TRILL header is added in block 616, or if the data packet is not received at an edge RBridge, and the "NO" branch of decision block 608 is taken, the data packet with the TRILL header is routed to the next-top RBridge in block 618, and the hop counter field in the TRILL header is decremented in block 620. A decision is made as to whether or not the packet is received at the egress RBridge in decision block 622. If not, the "NO" branch of decision block 622 is taken, and processing returns to block 618 where data packet with the TRILL header is routed to the next next-top RBridge. If the packet is received at the egress RBridge, the "YES" branch of decision block 622 is taken, and the TRILL header is removed in block 624. The data packet is routed to the destination address contained in the data packet in block 626, and the method ends in block 628.

Figure 7:
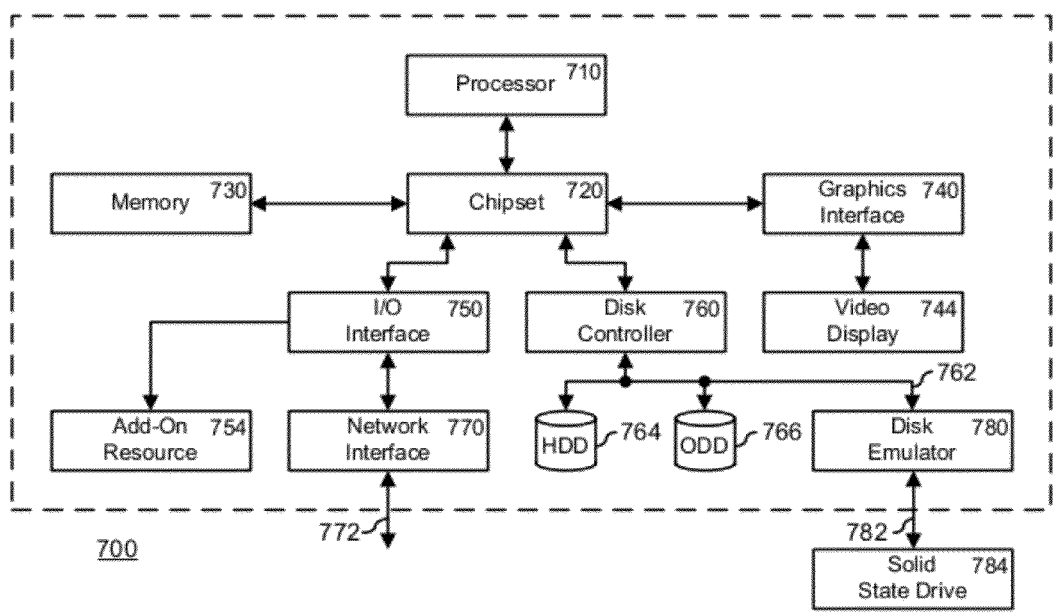
FIG. 7 is a functional block diagram illustrating an exemplary embodiment of an information handling system.

In a particular embodiment, an information handling system can be used to function as one or more of the network systems, or carry out one or more of the methods described above. In another embodiment, one or more of the systems described above can be implemented in the form of an information handling system. FIG. 7 illustrates a functional block diagram of an embodiment of an information handling system, generally designated as 700. Information handling system 700 includes processor 710, a chipset 720, a memory 730, a graphics interface 740, an input/output (I/O) interface 750, a disk controller 760, a network interface 770, and a disk emulator 780.

Processor 710 is coupled to chipset 720. Chipset 720 supports processor 710, allowing processor 710 to process machine-executable code. In a particular embodiment (not illustrated), information handling system 700 includes one or more additional processors, and chipset 720 supports the multiple processors, allowing for simultaneous processing by each of the processors, permitting the exchange of information between the processors and the other elements of information handling system 700. Processor 710 can be coupled to chipset 720 via a unique channel, or via a bus that shares information between processor 710, chipset 720, and other elements of information handling system 700.

Memory 730 is coupled to chipset 720. Memory 730 can be coupled to chipset 720 via a unique channel, or via a bus that shares information between chipset 720, memory 730, and other elements of information handling system 700. In particular, a bus can share information between processor 710, chipset 720 and memory 730. In a particular embodiment (not illustrated), processor 710 is coupled to memory 730 through a unique channel. In accordance with another aspect (not illustrated), an information handling system can include a separate memory dedicated to each of the processors. A non-limiting example of memory 730 includes static, dynamic. Or non-volatile random access memory (SRAM, DRAM, or NVRAM), read only memory (ROM), flash memory, another type of memory, or any combination thereof.

Graphics interface 740 is coupled to chipset 720. Graphics interface 740 can be coupled to chipset 720 via a unique channel, or via a bus that shares information between chipset 720, graphics interface 740, and other elements of information handling system 700. Graphics interface 740 is coupled to a video display 744. Other graphics interfaces (not illustrated) can also be used in addition to graphics interface 740 if needed or desired. Video display 744 can include one or more types of video displays, such as a flat panel display or other type of display device.

I/O interface 750 is coupled to chipset 720. I/O interface 750 can be coupled to chipset 720 via a unique channel, or via a bus that shares information between chipset 720, I/O interface 750, and other elements of information handling system 700. Other I/O interfaces (not illustrated) can also be used in addition to I/O interface 750 if needed or desired. I/O interface 750 is coupled to one or more add-on resources 754. Add-on resource 754 can also include another data storage system, a graphics interface, a network interface card (NIC), a sound/video processing card, another suitable add-on resource or any combination thereof.

Network interface device 770 is coupled to I/O interface 750. Network interface 770 can be coupled to I/O interface 750 via a unique channel, or via a bus that shares information between I/O interface 750, network interface 770, and other elements of information handling system 700. Other network interfaces (not illustrated) can also be used in addition to network interface 770 if needed or desired. Network interface 770 can be a network interface card (NIC) disposed within information handling system 700, on a main circuit board (e.g., a baseboard, a motherboard, or any combination thereof), integrated onto another component such as chipset 720, in another suitable location, or any combination thereof. Network interface 770 includes a network channel 772 that provide interfaces between information handling system 700 and other devices (not illustrated) that are external to information handling system 700. Network interface 770 can also include additional network channels (not illustrated).

Disk controller 760 is coupled to chipset 710. Disk controller 760 can be coupled to chipset 720 via a unique channel, or via a bus that shares information between chipset 720, disk controller 760, and other elements of information handling system 700. Other disk controllers (not illustrated) can also be used in addition to disk controller 760 if needed or desired. Disk controller 760 can include a disk interface 762. Disk controller 760 can be coupled to one or more disk drives via disk interface 762. Such disk drives include a hard disk drive (HDD) 764 or an optical disk drive (ODD) 766 (e.g., a Read/Write Compact Disk (R/W-CD), a Read/Write Digital Video Disk (R/W-DVD), a Read/Write mini Digital Video Disk (R/W mini-DVD), or another type of optical disk drive), or any combination thereof. Additionally, disk controller 760 can be coupled to disk emulator 780. Disk emulator 780 can permit a solid-state drive 784 to be coupled to information handling system 700 via an external interface. The external interface can include industry standard busses (e.g., USB or IEEE 1384 (Firewire)) or proprietary busses, or any combination thereof. Alternatively, solid-state drive 784 can be disposed within information handling system 700.

In a particular embodiment, HDD 744, ODD 766, solid state drive 784, or a combination thereof include a computer-readable medium in which one or more sets of machine-executable instructions such as software, can be embedded. For example, the instructions can embody one or more of the methods or logic as described herein. In a particular embodiment, the instructions reside completely, or at least partially, within memory 730, and/or within processor 710 during execution by information handling system 700. Memory 730 and processor 710 can also include computer-readable media.

When referred to as a "device," a "module," or the like, the embodiments described above can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A routing bridge in a Transparent Interconnection of Lots of Links (TRILL) domain, comprising:
   a first link coupled to a first device in the TRILL domain;
   an Intermediate System to Intermediate System (IS-IS) Traffic Engineering (TE) module operable to:
   receive first configuration information from the first device; and determine that data packets received by the routing bridge need to be routed to the first device based upon the first configuration information; and
a TRILL header module operable to:
determine that the routing bridge is not a last RBridge in a first TRILL path field of a first TRILL header in a first data packet; and
decrement a first hop count value in a first hop count field of the first TRILL header; and
wherein the routing bridge is operable to:
receive the first data packet;
forward the first data packet to a next hop RBridge based on the first TRILL path field;
receive a second data packet; and
route the second data packet to the first link in response to the IS-IS TE module determining that the second packet needs to be routed to the first device.

2. The routing bridge of claim 1, wherein further:
the first device is coupled to a second device;
the IS-IS TE module is further operable to:
receive second configuration information from the second device; and
determine that data packets received by the routing bridge need to be routed to the first device and then from the first device to the second device based on upon the second configuration information;
wherein the routing bridge is operable to:
receive a third data packet;
route the third data packet to the first link in response to the IS-IS TE module determining that the third packet needs to be routed to the first device and then from the first device to the second device; and
direct the first device to route the third data packet to the second device.

3. The routing bridge of claim 2 wherein the TRILL header module is operable to add a second TRILL header to a fourth data packet, the second TRILL header including:
a second TRILL path field that includes a sequential list of a plurality of RBridges that the fourth data packet is to hop in the TRILL domain; and
a second hop count field that includes a second hop count value that provides a number for the plurality of RBridges that the fourth data packet will hop in the TRILL domain.

4. The routing bridge of claim 3, wherein further:
the TRILL header module is further operable to:
determine that the routing bridge is a last RBridge in a third TRILL path field of a third TRILL header in a fifth data packet; and
remove the third TRILL header from the fifth data packet in response to determining that the routing bridge is the last RBridge in the third TRILL path field of the third TRILL header; and
the routing bridge is further operable to:
receive the fifth data packet; and
forward the fifth data packet to a third device that is not in the TRILL domain.

5. The routing bridge of claim 3, wherein further the sequential list of the plurality of RBridges is determined based upon a plurality of corresponding configuration information received by the IS-IS TE module.

6. The routing bridge of claim 1, wherein the first configuration information includes a data rate for the first device.

7. The routing bridge of claim 1, wherein the first configuration information includes a maximum transmission unit size for the first device.

8. A method comprising:
coupling a first link of a routing bridge to a first device in a TRILL domain;
receiving at an Intermediate System to Intermediate System (IS-IS) Traffic Engineering (TE) module of the routing bridge first configuration information from the first device;
determining that data packets received by the routing bridge need to be routed to the first device based upon the first configuration information;
determining that the routing bridge is not a last RBridge in a first TRILL path field of a first TRILL header in a first data packet
decrementing a first hop count value in a first hop count field of the first TRILL header;
receiving the first data packet at the routing bridge;
forwarding the first data packet to a next hop RBridge based on the first TRILL path field;
receiving a second data packet at the routing bridge; and
routing the second data packet to the first link in response to the IS-IS TE module determining that the first packet needs to be routed to the first device.

9. The method of claim 8, wherein:
the first device is coupled to a second device;
the method further comprising:
receiving second configuration information from the second device;
determining that data packets received by the routing bridge need to be routed to the first device and then from the first device to the second device based on upon the second configuration information;
receiving a third data packet at the routing bridge;
routing the third data packet to the first link in response to the IS-IS TE module determining that the third packet needs to be routed to the first device and then from the first device to the second device; and
directing the first device to route the third data packet to the second device.

10. The method of claim 9, further comprising:
adding a second TRILL header to a fourth data packet, the second TRILL header including:
a second TRILL path field that includes a sequential list of a plurality of RBridges that a fourth data packet is to hop in the TRILL domain; and
a second hop count field that includes a second hop count value that provides a number for the plurality of RBridges that the fourth data packet will hop in the TRILL domain.

11. The method of claim 10, further comprising:
determining that the routing bridge is a last RBridge in a third TRILL path field of a third TRILL header in a fifth data packet;
removing the second TRILL header from the fifth data packet in response to determining that the routing bridge is the last RBridge; and
receiving the fifth data packet at the routing bridge; and
forwarding the fifth data packet to a third device that is not in the TRILL domain.

12. The method of claim 10, wherein the sequential list of the plurality of RBridges is determined based upon a plurality of corresponding configuration information received by the IS-IS TE module.

13. The method of claim 8, wherein the first configuration information includes a data rate for the first device.

14. Machine-executable code for an information handling system, wherein the machine-executable code is embedded within a non-transitory medium and includes instructions for carrying out a method, the method comprising:
coupling a first link of a routing bridge to a first device in a TRILL domain;
receiving at an Intermediate System to Intermediate System (IS-IS) Traffic Engineering (TE) module of the routing bridge first configuration information from the first device;
determining that data packets received by the routing bridge need to be routed to the first device based upon the first configuration information;
receiving a first data packet at the routing bridge;
routing the first data packet to the first link in response to the IS-IS TE module determining that the first packet needs to be routed to the first device;
adding a first TRILL header to a third data packet, the first TRILL header including:
a first TRILL path field that includes a sequential list of a plurality of RBridges that a third data packet is to hop in the TRILL domain; and
a first hop count field that includes a first hop count value that provides a number for the plurality of RBridges that the third data packet will hop in the TRILL domain;
determining that the routing bridge is not a last RBridge in a second TRILL path field of a second TRILL header in a fourth data packet;
decrementing a second hop count value in a second hop count field of the second TRILL header;
receiving the fourth data packet at the routing bridge; and
forwarding the fourth data packet to a next hop RBridge, based on the second TRILL path field.

15. The machine-executable code of claim 14, the method further comprising:
the first device is coupled to a second device;
the method further comprising:
receiving second configuration information from the second device;
determining that data packets received by the routing bridge need to be routed to the first device and then from the first device to the second device based on upon the second configuration information;
receiving a second data packet at the routing bridge;
routing the second data packet to the first link in response to the IS-IS TE module determining that the second packet needs to be routed to the first device and then from the first device to the second device; and
directing the first device to route the second data packet to the second device.

16. The machine-executable code of claim 15, the method further comprising:
determining that the routing bridge is a last RBridge in a second TRILL path field of a second TRILL header in a fourth data packet;
removing the second TRILL header from the fourth data packet in response to determining that the routing bridge is the last RBridge; and
receiving the fourth data packet at the routing bridge; and
forwarding the fourth data packet to a third device that is not in the TRILL domain.

* * * * *